United States Patent
Lekon et al.

(10) Patent No.: US 11,511,593 B2
(45) Date of Patent: Nov. 29, 2022

(54) METHOD OF OPERATING AN ADJUSTABLE ROLL STABILIZER

(71) Applicant: ZF Friedrichshafen AG, Friedrichshafen (DE)

(72) Inventors: Stefan Lekon, Stemwede (DE); Hubertus Eilers, Hilter (DE); Gerald Holz, Constance (DE); Michael Beller, Aitrach (DE); Thomas Hodrius, Weiler-Simmerberg (DE); Joachim Engel, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 156 days.

(21) Appl. No.: 17/003,268

(22) Filed: Aug. 26, 2020

(65) Prior Publication Data

US 2021/0061051 A1 Mar. 4, 2021

(30) Foreign Application Priority Data

Sep. 3, 2019 (DE) ...................... 10 2019 213 280.4

(51) Int. Cl.
*B60G 21/055* (2006.01)
*H02P 21/10* (2016.01)
*B60G 17/015* (2006.01)

(52) U.S. Cl.
CPC ..... *B60G 21/0555* (2013.01); *B60G 17/0157* (2013.01); *H02P 21/10* (2013.01); *B60G 2400/204* (2013.01)

(58) Field of Classification Search
CPC ............ B60G 21/0555; B60G 17/0157; B60G 2400/204; B60G 2400/252;
(Continued)

(56) References Cited

U.S. PATENT DOCUMENTS

2005/0023789 A1* 2/2005 Suzuki ............... B60G 21/0555
280/124.106
2006/0192354 A1* 8/2006 Van Cayzeele .... B60G 17/0165
280/5.506
(Continued)

FOREIGN PATENT DOCUMENTS

CN 105936201 A * 9/2016 ......... B60G 17/0162
DE 10 2009 007 357 A1 8/2010
(Continued)

OTHER PUBLICATIONS

Weber I, 'Machine Translation of DE 102009007357 A1 Obtained Apr. 21, 2022', Aug. 12, 2010, Entire Document (Year: 2010).*

*Primary Examiner* — James A English
*Assistant Examiner* — Scott F. Underwood
(74) *Attorney, Agent, or Firm* — Finch & Maloney PLLC

(57) ABSTRACT

A method of operating an adjustable roll stabilizer (1) of a motor vehicle. The adjustable roll stabilizer (1) includes an actuator (2) which can rotate relative to a rotational axis (3) in order to twist two stabilizer sections (6a, 6b) connected thereto relative to one another about the rotational axis (3). The stabilizer sections (6a, 6b) are radially spaced away from the rotational axis (3) and each is coupled to a wheel suspension (7a, 7b, 8a, 8b, 9a, 9b). The actuator (2) is controlled on the basis of a system target torque specified for the vehicle, and the specified system target torque is tested for acceptability in relation to a roll torque distribution ($\beta$) that is acceptable for the motor vehicle.

10 Claims, 4 Drawing Sheets

(58) Field of Classification Search
CPC .......... B60G 2600/08; B60G 2600/09; B60G 21/10; B60G 2200/341; B60G 2204/82; H02P 21/10; H02P 21/22
See application file for complete search history.

(56) References Cited

U.S. PATENT DOCUMENTS

| | | | | |
|---|---|---|---|---|
| 2006/0212199 A1* | 9/2006 | Urababa | ............ | B60G 21/0558 701/38 |
| 2008/0073864 A1* | 3/2008 | Webers | ............. | B60G 17/0162 280/5.506 |
| 2008/0221757 A1* | 9/2008 | Ketteler | ............. | B60G 21/0558 701/37 |
| 2008/0262678 A1* | 10/2008 | Nishimura | ........... | B62D 5/0472 701/42 |
| 2011/0208391 A1* | 8/2011 | Mizuta | ............... | B60G 21/0555 701/37 |
| 2016/0001626 A1* | 1/2016 | Illg | ...................... | B60G 17/018 280/5.521 |
| 2017/0008366 A1* | 1/2017 | Füssl | .................. | B60G 21/0556 |
| 2021/0260952 A1* | 8/2021 | Saylor | .................. | B60G 21/005 |
| 2022/0009303 A1* | 1/2022 | Beddis | ............... | B60G 21/0553 |

FOREIGN PATENT DOCUMENTS

| | | | | |
|---|---|---|---|---|
| DE | 10 2016 219 399 A1 | | 8/2017 | |
| EP | 1362720 A2 | * | 11/2003 | ......... B60G 21/0555 |
| EP | 1417108 B1 | * | 7/2006 | ......... B60G 17/0162 |

\* cited by examiner

METHOD OF OPERATING AN ADJUSTABLE ROLL STABILIZER

This application claims priority from German patent application serial no. 10 2019 213 280.4 filed Sep. 3, 2019.

FIELD OF THE INVENTION

The invention relates to a method for operating an adjustable roll stabilizer for a motor vehicle and to a motor vehicle with two.

BACKGROUND OF THE INVENTION

From automotive technology, in particular chassis technology, it is known to influence the roll or rolling behavior of motor vehicles by means of so-termed roll stabilizers. In such cases the basic structure consists of an essentially C-shaped torsion bar spring which, in its central area, is mounted rotatably relative to the vehicle body and whose outer, opposite ends are in each case coupled to a wheel suspension by means of coupling elements termed hinged supports. By virtue of this design, the roll stabilizer ensures that when driving round a curve, the body of the vehicle is deflected not only on the outside of the curve (due to the centrifugal force), but also that the wheel on the inside of the curve is somewhat lowered. Roll stabilizers improve the track-keeping of the vehicle and reduce the lateral inclination of the vehicle body (rolling), which makes driving round curves safer and more comfortable.

To further increase vehicle stability and driving comfort, it is known to make such roll stabilizers adjustable. In that case the roll stabilizer comprises an actuator and is divided into two stabilizer sections that, with the help of the actuator, can twist relative to one another about a rotational axis. By rotating the stabilizer sections relative to one another, a rolling movement of the vehicle body is produced in a controlled manner or a rolling movement of the vehicle body caused by external influences is selectively counteracted. From the prior art adjustable roll stabilizers are known, whose actuator comprises an electric motor which is in driving connection with a mechanical gear system, particularly in the form of a multi-step planetary gearset, in order to produce suitable rotational speeds and torques. In this connection reference should be made, for example, to DE 10 2016 219 399 A1.

Besides the design of an adjustable roll stabilizer, its appropriate control also poses a technical challenge. In this connection reference should be made to DE 10 2009 007 357 A1, which describes a method for operating an adjustable roll stabilizer of a motor vehicle with two axles. Among other things, the prioritizing of various regulation strategies for the roll support of a two-axled vehicle are discussed.

Quite generally, in the context of an active roll stabilization system of a motor vehicle fitted therewith, an adjustable roll stabilizer can be used to distribute an overall supporting torque for the motor vehicle between the front axle and the rear axle, in order in that way, for example in certain situations, to increase the driving stability and/or the driving comfort. Particularly in the case of a two-axled motor vehicle with an adjustable roll stabilizer on the front axle and also an adjustable roll stabilizer on the rear axle, the overall supporting torque for the motor vehicle is distributed between the actuator associated with the front axle and the actuator associated with the rear axle so that the division between them can be influenced by appropriate control. In a manner known as such, for example a motor vehicle tends in principle to under-steer more markedly when too large a proportion of the overall supporting torque is assumed by the actuator on the front axle. Conversely, a motor vehicle tends in principle to over-steer more when too large a proportion of the overall supporting torque is assumed by the actuator on the rear axle.

SUMMARY OF THE INVENTION

A purpose of the present invention is to indicate a method for operating an adjustable roll stabilizer of a motor vehicle, which contributes toward preventing excessive over-steering and/or excessive under-steering. In addition a two-axled motor vehicle with two adjustable roll stabilizers should be indicated, in which, correspondingly, excessive over-steering and/or under-steering are prevented.

The objective is achieved, first, by a method of operating an adjustable roll stabilizer of a motor vehicle, which method has the characteristics specified in the independent claim(s). In the method according to the invention, the adjustable roll stabilizer comprises an actuator which can be rotated relative to a rotational axis in order to twist two stabilizer sections connected thereto relative to one another about the rotational axis. The stabilizer sections are radially a distance away from the rotational axis and each is coupled to a respective wheel suspension. According to the invention, the actuator is controlled on the basis of a system target torque specified for the vehicle, and the system target torque is checked for acceptability in relation to a roll torque distribution acceptable for the vehicle.

According to the invention it is first recognized that an adjustable roll stabilizer is useful not only for influencing the rolling behavior of the motor vehicle, but also that with the help of an adjustable roll stabilizer a torque distribution of the motor vehicle, in other words a distribution of the overall roll torque supported by the vehicle between the two axles, can be influenced. The overall roll torque supported by the vehicle is divided into a roll torque supported by the front axle and a roll torque supported by the rear axle, so that already by using at least one adjustable roll stabilizer (on at least one axle of the motor vehicle) the distribution of the overall roll torque supported between the axles can be influenced within certain limits. To avoid over-steering or under-steering behavior of the motor vehicle, according to the invention the idea was developed to test a system target torque—specified for the vehicle—on the basis of which the actuator of the adjustable roll stabilizer is controlled, for acceptability in relation to a roll torque distribution acceptable for the vehicle.

According to an advantageous embodiment of the method, the testing of the system target torque for acceptability is done by determining for the specified system target torque a roll torque that results therefrom, and carrying out a comparison to see whether the roll torque distribution lies within an acceptable range.

Advantageously, in this case the acceptable range of the roll torque distribution is specified by at least one, in particular vehicle-speed-dependent, limiting curve. Expediently, this is a limiting curve which, for example, has been determined by previous test drives and/or by modeling of the motor vehicle.

According to a particularly preferred further development, the acceptable range of the roll torque distribution is bounded by an upper limiting curve and a lower limiting curve, and the roll torque distribution is deemed to be acceptable if the roll torque distribution determined is below the upper limiting curve and above the lower limiting curve for the roll torque distribution. In other words, the upper limiting curve and the lower limiting curve delimit between them an acceptability range within which the roll torque distribution can fluctuate without any particular risk that the motor vehicle will over-steer or under-steer.

An advantageous further development of the method provides that if acceptability is lacking (i.e. when the system target torque specified for the adjustable roll stabilizer results in a roll torque distribution which is outside the acceptable range), an error measure is initiated. Expediently, it can be provided that such an error measure is only initiated if a maximum acceptable error tolerance time is exceeded.

Basically, an error measure can be one or more of various measures, among others such as visual and/or acoustic warning signals. Since an unacceptable roll torque distribution has a negative effect on the driving safety of the motor vehicle, it can be advantageous for the error measure to include at least a change to a safer condition, in particular by switching off the adjustable roll stabilizer of the motor vehicle. If the motor vehicle is equipped with more than one adjustable roll stabilizer, then expediently all the adjustable roll stabilizers can be switched off.

To test the specified system target torque for acceptability, in particular for the determination of the roll torque distribution required for that, an advantageous embodiment of the method described in the context of the invention provides that besides the system target torque specified for the adjustable roll stabilizer, a system target torque specified for a further adjustable roll stabilizer of the vehicle is taken into account. In other words, for the acceptability testing of the roll torque distribution, the system target torques of both the front axle and the rear axle are considered.

In the context of the present invention the roll torque distribution is to be understood in the narrower sense as the ratio of the roll torque supported by a first axle (the front axle) relative to the overall roll torque supported by the motor vehicle. Correspondingly, it is advantageous to determine the roll torque distribution from the ratio of the roll torque supported by a first axle (the front axle) relative to the overall roll torque supported by the motor vehicle. In this connection it should be mentioned that the overall roll torque supported by the motor vehicle is determined as the sum of the roll torque supported by the first axle (the front axle) and the roll torque supported by the second axle (the rear axle).

The actuator of an adjustable roll stabilizer can be controlled in various ways. In particular, for this various regulation systems can be used. According to an expedient further development of the method, the actuator is controlled on the basis of the system target torque in such manner that the system target torque is taken into account for the determination of a target angle, from which a target motor torque for controlling a motor of the actuator is then determined by means of a position-rotational speed regulator.

The method described above for operating an adjustable roll stabilizer of a motor vehicle is directed, first, at the operation of an adjustable roll stabilizer in its own right. Thus, the acceptability test described in the context of the invention takes place in connection with the regulation of the adjustable roll stabilizer concerned. Since motor vehicles can also be equipped with roll stabilizers on each of their axles, according to an advantageous further development of the method it can be provided that this is used for operating two adjustable roll stabilizers of the motor vehicle, since the actuator of each one of the two adjustable roll stabilizers is controlled on the basis of a system target torque specified for the vehicle for each of the axles, wherein in each case an independent test of the specified system target torque for acceptability in relation to the roll torque distribution that is acceptable for the vehicle is carried out. Thus, at the level of each axle of the motor vehicle independently, a test of the system target torque for acceptability is carried out. Advantageously, it can be provided that if the system target torque is found to be unacceptable, that unacceptability is communicated to the regulation system of the other respective axle, so that a suitable error measure that correspondingly covers both axles can be initiated.

The objective mentioned at the start is also achieved by a two-axled motor vehicle with two adjustable roll stabilizers, having the characteristics specified in the independent claim(s). This is a two-axled motor vehicle with two adjustable roll stabilizers, which are in particular suitable for carrying out a method as described above, and of which one adjustable roll stabilizer is associated with a front axle and a further adjustable roll stabilizer is associated with a rear axle, such that each of the two adjustable roll stabilizers, respectively, can be controlled as a function of a vehicle-side specified guide magnitude in the form of an axle-related system target torque, wherein each of the adjustable roll stabilizers is associated with a device for testing the relevant axle-related system target torque for acceptability in relation to a roll torque distribution that is acceptable for the vehicle.

BRIEF DESCRIPTION OF DRAWINGS

Below, the invention will be described in greater detail with reference to drawings, from which further advantageous design features too emerge. The drawings show.

DETAILED DESCRIPTION OF THE PREFERRED EMBODIMENTS

Figure 1:
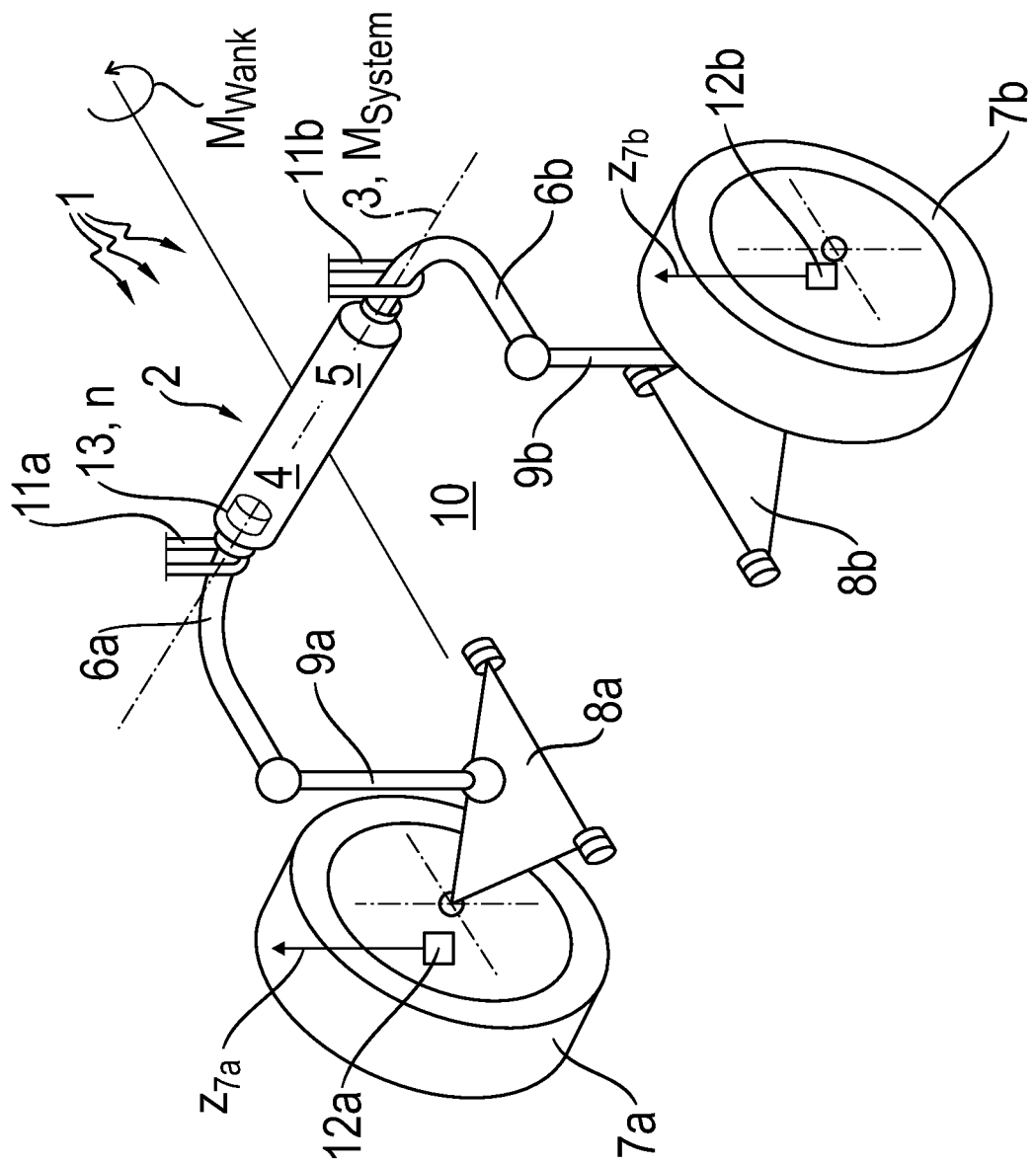
FIG. 1: An adjustable roll stabilizer for a motor vehicle, represented schematically.

To clarify the field of use of the invention, FIG. 1 first shows a schematic representation of an adjustable roll stabilizer 1. The adjustable roll stabilizer 1 is part of a chassis (not shown completely) of a motor vehicle (not shown). Of the motor vehicle, only the vehicle body is indicated by an index 10. The roll stabilizer 1 is also part of an axle of the motor vehicle, for example the front axle and/or the rear axle of the motor vehicle can be equipped with the adjustable roll stabilizer 1.

As shown in FIG. 1, a wheel 7*a* arranged on the left, and on the opposite side of the vehicle a wheel 7*b* on the right are each connected to the vehicle body 10 by a control arm arrangement 8*a* and 8*b* respectively, which need no further explanation. Thus, the wheel 7*a* and its control arm arrangement 8*a* and the wheel 7*b* and its control arm arrangement 8*b* form in each case a unit, and are coupled by a respective hinged support 9*a* and 9*b* to an end of an associated stabilizer section 6*a* and 6*b* of the adjustable roll stabilizer 1. The left-hand stabilizer section 6*a* and the right-hand stabilizer section 6*b* are connected to one another in the middle of the vehicle by an actuator 2 represented as an essentially cylindrical body.

In a manner known as such, the adjustable roll stabilizer 1 is mounted to rotate relative to the vehicle body 10 about a rotational axis 3, this being enabled by a stabilizer mounting 11a on the left and a stabilizer mounting 11b on the right, which—shown in a simplified manner in FIG. 1—surround areas of the respective stabilizer sections 6a or 6b adjacent to the actuator 2 in a U-shape.

The actuator 2, represented here as a cylindrical body, essentially comprises a housing (not indexed) which is essentially rotationally-symmetric relative to the rotational axis 3, in which housing are accommodated an electric motor 4, a multi-step planetary transmission 5 and a rotational speed sensor 13 (in each case indicated only by an index). By way of the electric motor 4 and the multi-step planetary transmission 5 the stabilizer sections 6a and 6b are in drive connection with one another. When the actuator 2 is static, the two stabilizer sections 6a, 6b are solidly connected with one another by the static electric motor 4 and the multi-step planetary transmission 5 in drive connection with it. However, by operating the electric motor 4 the two stabilizer sections 6a, 6b can be twisted relatively to one another about the rotational axis 3, in accordance with the rotational direction of the electric motor 4. During this the multi-step planetary transmission 5 produces a fixed rotational speed ratio between the drive input (electric motor 4) and the drive output (the right-hand stabilizer section 6b coupled to the transmission output). In that way the adjustable roll stabilizer can be adjusted in a manner known as such.

Depending on the operating condition of the adjustable roll stabilizer 1 or the vehicle equipped with it, torsion can occur in the stabilizer sections 6a, 6b coupled with one another via the actuator 2, as a function of which a torque $M_{System}$ acting about the rotational axis 3 is developed. This torque is applied to the actuator 2 in the form of a system torque.

With the help of the roll stabilizer 1 a roll torque $M_{Wank}$ can be supported, which acts between the vehicle body 10 and the wheels 7a, 7b. By adjusting the roll stabilizer 1 the roll torque $M_{Wank}$ that can be supported can be influenced. For the regulation of the roll stabilizer 1 according to need, height level sensors 12a and 12b are associated with the left- and right-hand wheels 7a, 7b, which sensors enable the wheel stroke movements of the respective wheels to be detected and which emits them in the form of a height level z7a for the left-hand wheel and a height level z7b for the right-hand wheel. In addition the rotation of the electric motor 4 can be detected by the rotational speed sensor 13 and this is emitted in the form of a rotational speed signal as the motor rotational speed n.

The regulation of the adjustable roll stabilizer 1 represented schematically in FIG. 1 is explained in greater detail below with reference to the regulation strategy shown in FIG. 2. According to this, for the regulation of the adjustable roll stabilizer 1 a so-termed system target torque is entered as an input magnitude. This is a magnitude specified for the vehicle, which corresponds to the torque $M_{System}$ acting about the rotational axis 3 (see FIG. 1), which is to be supported by the adjustable roll stabilizer 1 at the level of the actuator and which therefore acts upon the actuator 2—comprising the electric motor 4 and the transmission 5—in the rotation direction about the rotational axis 3. By virtue of the kinematic interaction of the adjustable roll stabilizer 1, the wheel suspensions 7a, 7b, 8a, 8b, 9a, 9b and the connections 11a, 11b to the vehicle body 10, the adjustable roll stabilizer 1 thus supports—at the vehicle level—an axle-related roll torque $M_{Wank}$ (see FIG. 1, directed around the longitudinal direction of the vehicle).

The system target torque is converted via a known system rigidity to a rotation angle for the torque required, the known system rigidity being composed of individual rigidities, in particular the rigidities of the stabilizer itself (stabilizer sections, transmission, housing, decoupling elements if present, hinged supports, stabilizer mountings and the like).

In parallel, the regulation of the adjustable roll stabilizer 1 also takes into account a magnitude for the compensation of perturbations. For this, wheel movement data detected by the height level sensors associated with the wheels, in the form of height level signals (for the individual wheels) and a table of characteristic values for a decoupling angle (with previously determined vehicle-specific data) are used for determining a so-termed "zero torque angle", i.e. that angle which corresponds to the outer rotation angle of the adjustable roll stabilizer, perhaps caused by a bumpy road, and which would put the actuator of the adjustable roll stabilizer in a torque-free position. The two angles determined in this way, namely the rotation angle for the torque requirement and the zero-torque angle, are then added to obtain a target angle.

The target angle is then fed into a cascading position-rotational speed regulator. This comprises a position regulator which from the incoming target angle—and also having regard to a feedback signal from the motor—determines a target rotational speed, which in turn is passed to a rotational speed regulator. On the basis of the target rotational speed and a feedback from the electric motor (rotational speed), the rotational speed regulator determines a target motor torque for controlling the electric motor. The target motor torque is in turn fed into a field-orientated regulator which—again having regard to feedback signals from the electric motor—controls the electric motor 4 of the actuator 2. A motor output torque produced by the electric motor 4 is transformed—this time via a mechanical route—by way of a gear system 5 (multi-step planetary gearset) into a system torque, which acts between the stabilizer sections (see FIG. 1, indexes 6a and 6b).

Figure 2:
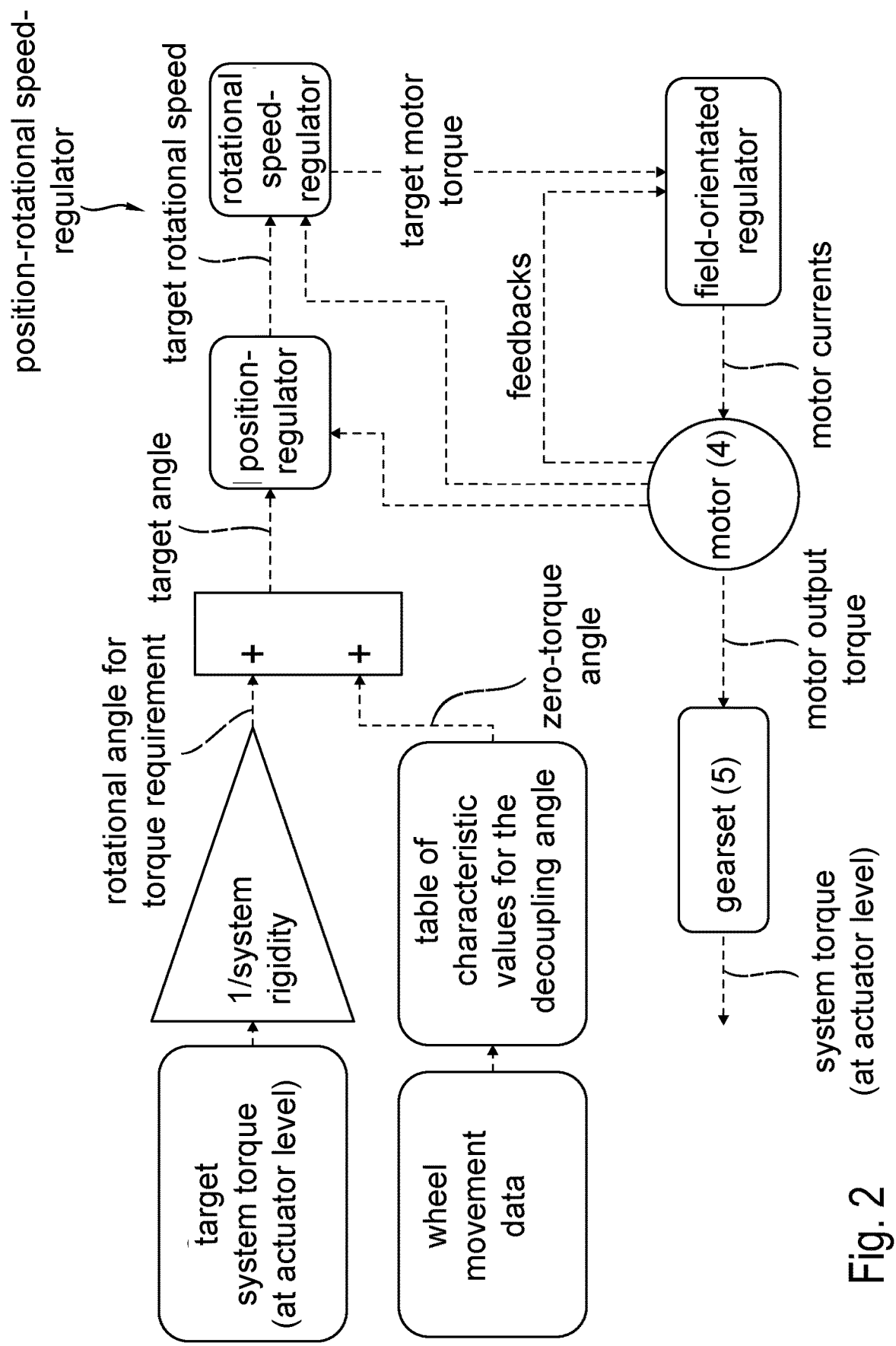
FIG. 2: A graphical representation of a regulation strategy of an adjustable roll stabilizer.

The regulation scheme shown in FIG. 2 is advantageously used with an adjustable roll stabilizer 1 of the type shown in FIG. 1. With the regulation principle described therein, an incoming system target torque is converted via the system rigidity into a target angle from which, by means of a position-rotational speed regulator, a target motor torque is determined, whereby the motor is acted upon with corresponding motor currents.

The regulation strategy for an adjustable roll stabilizer 1 described as an example with reference to FIGS. 1 and 2 is first of all axle-related. Thus, the system target torque entered as an input signal is a magnitude predetermined by the vehicle for the axle concerned and the adjustable roll stabilizer associated therewith. This corresponds to a roll torque $M_{Wank}$ which has to be supported by the axle concerned (axle related). When a motor vehicle is equipped with an adjustable roll stabilizer, preferably with two adjustable roll stabilizers (front and rear axles), it is possible in the context of the active roll stabilization to distribute an overall roll torque of the motor vehicle that is to be supported at the two axles, between the front axle and the rear axle. At the vehicle level this is done by specifying for each adjustable roll stabilizer (present) a corresponding system target torque, i.e. a system torque $M_{System}$ to be supported by each respective actuator 2.

As a function of the distribution of the roll torque to be supported by each axle, for the motor vehicle a so-termed roll torque distribution β is obtained, which is determined from the ratio between the roll torque supported by the front axle and the overall roll torque supported by the motor vehicle.

In a manner known as such, in principle motor vehicles tend to under-steer when too large a proportion of the overall torque supported is applied at the front axle, whereas in principle vehicles tend to over-steer when too large a proportion of the overall torque is supported at the rear axle.

In the context of the invention it is provided that a system target torque specified for an adjustable roll stabilizer is tested for acceptability in relation to a roll torque distribution β that is acceptable for the vehicle.

Figure 3:
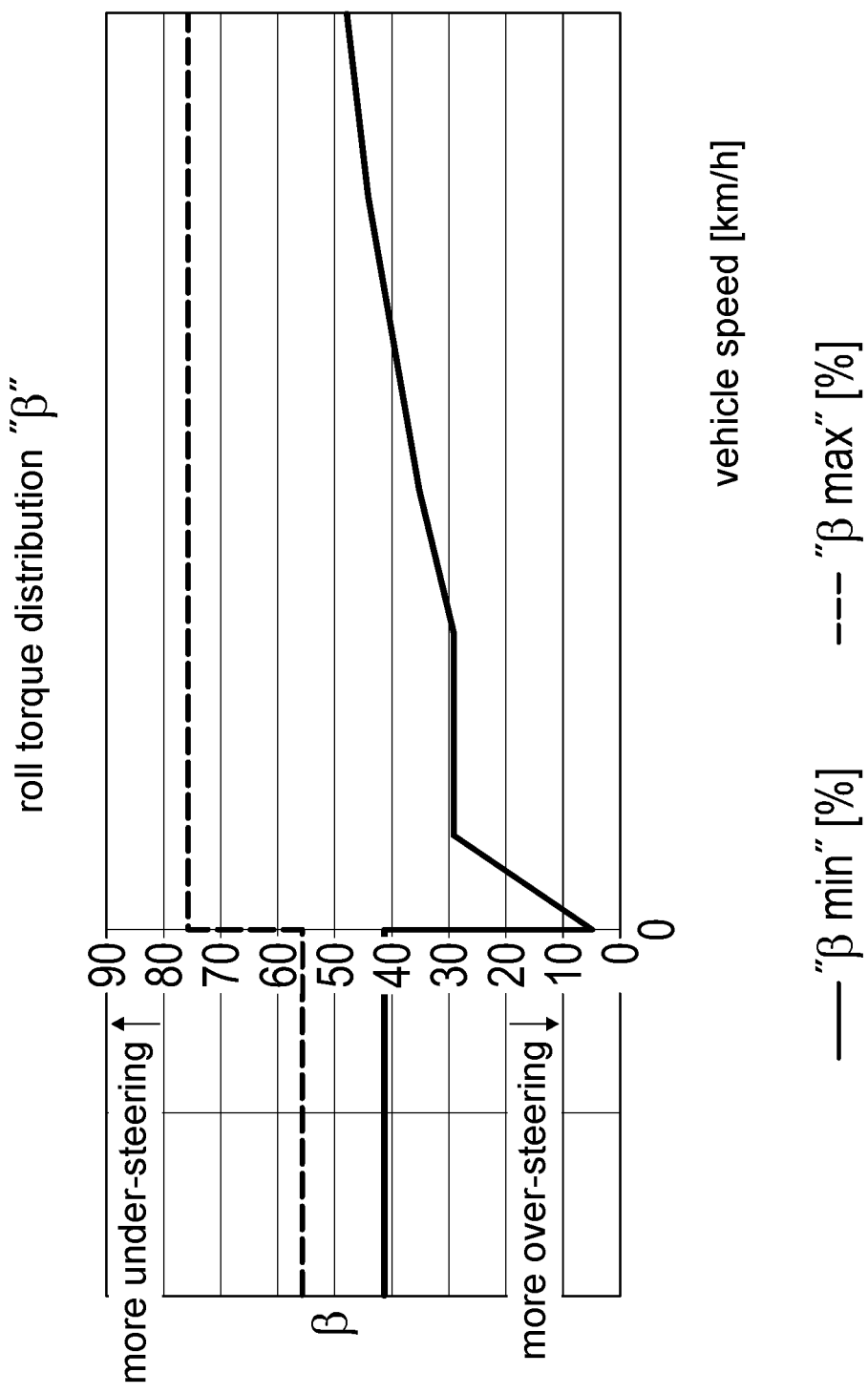
FIG. 3: An example representation of two limiting curves for the roll torque distribution.

In this connection reference should first be made to FIG. 3, which shows as an example two limiting curves for the roll torque distribution. The diagram contains an upper limiting curve (broken line) and a lower limiting curve (continuous line) for the roll torque distribution β. As a function of a vehicle speed, a lower limiting curve is obtained for the roll torque distribution β, which at first rises steeply, then remains constant and after exceeding a medium speed increases linearly again. The upper limiting curve remains constant (at positive vehicle speeds) at a value substantially higher than 50%.

With a two-axled motor vehicle for which the limiting curves shown in FIG. 3 was determined, in principle the vehicle tends to under-steer when an actual roll torque distribution β of the motor vehicle exceeds the upper limiting curve. On the other hand, in principle the motor vehicle tends to over-steer when the actual roll torque distribution β of the motor vehicle—in this case depending on the speed of the vehicle—falls below a corresponding value of the lower limiting curve. When the actual roll torque distribution β of the motor vehicle exceeds or falls below the limiting curves, there is a tendency to under-steer or over-steer, respectively, and in such cases the vehicle can become uncontrollable for a less experienced driver, at least in certain driving situations.

Explicitly, the roll torque distribution β can be calculated as:

$$\beta = (\text{front axle supporting torque})/(\text{front axle supporting torque} + \text{rear axle supporting torque}).$$

To test a system target torque specified for the vehicle (see also the explanation relating to FIG. 2), for acceptability in relation to a roll torque distribution β that is acceptable for the motor vehicle, the invention proposes that for the specified system target torque a roll torque distribution β obtained in that way is first determined, and then a comparison is carried out to see whether the roll torque distribution β (so obtained) lies within an acceptable range where an acceptable range is in particular understood to mean that the roll torque distribution β lies below an upper limiting curve and above a lower limiting curve for the roll torque distribution (see FIG. 3). If the result is not acceptable i.e. if the roll torque distribution β is outside the acceptable range, the initiation of an error measure, in particular switching off the roll stabilizers of the motor vehicle, is provided for.

Figure 4:
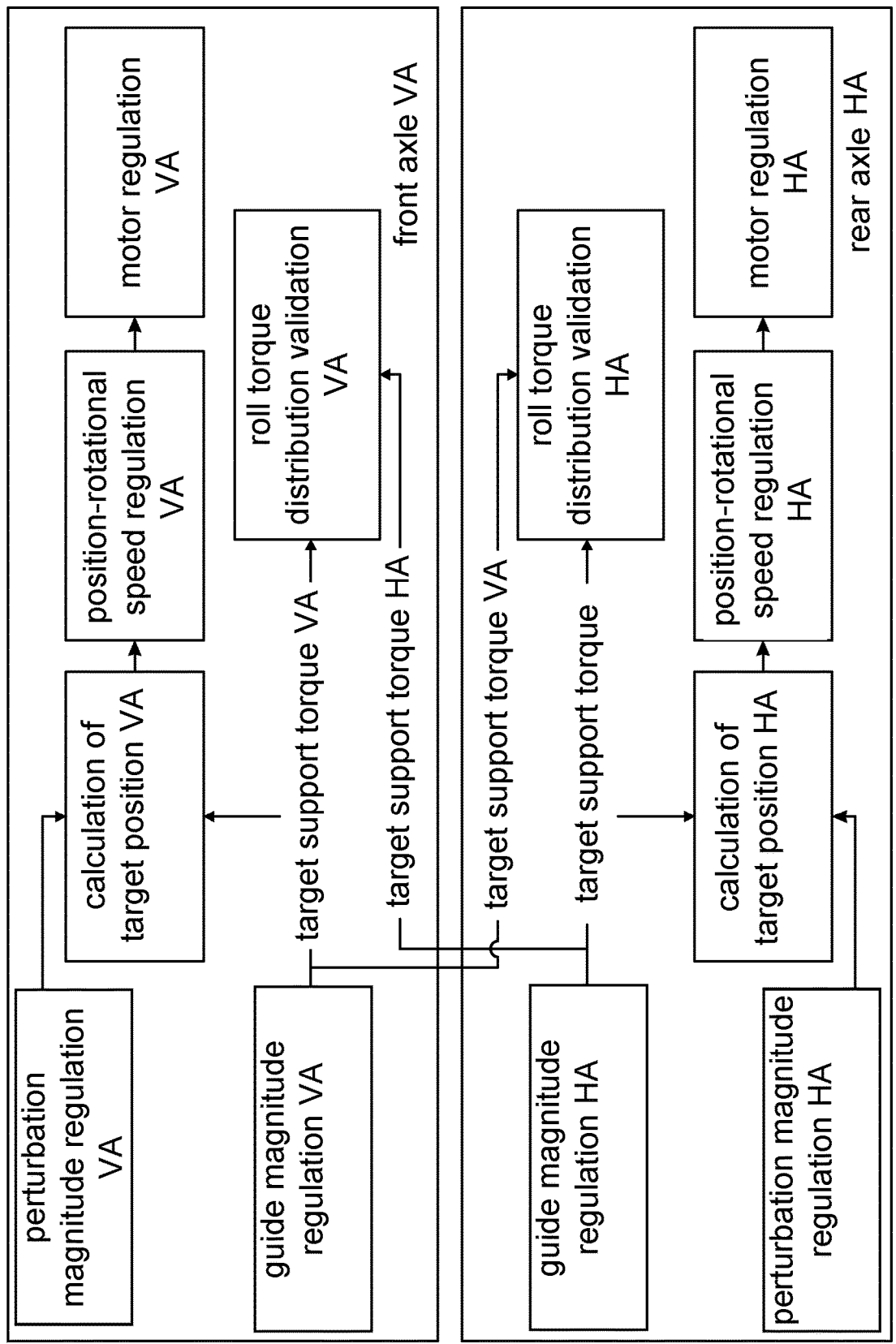
FIG. 4: A graphical overview diagram for roll stabilization in a two-axled motor vehicle, having regard to the roll torque distribution.

For further explanation reference should now be made to FIG. 4, which shows a graphical overview diagram for the roll stabilization in a two-axled motor vehicle, having regard to the roll torque distribution. Shown in a diagrammatically simplified manner by an upper rectangle and a lower rectangle, there are respectively a regulation scheme for the front axle (VA) and under that, a regulation scheme for the rear axle (HA). In principle the regulation methods used for the front and rear axles are identical. Accordingly, to avoid repetitions, first only the regulation pertaining to the front axle will be explained.

For the most part, as shown in the upper rectangle in FIG. 4, the regulation for the front axle (VA) is the regulation system already explained with reference to FIG. 2, which however, for representational reasons, is reproduced in a simplified manner. The regulation involves a guide magnitude regulation VA and a perturbation magnitude regulation VA, both of which are used in the calculation of a target position VA.

The calculation of the target position VA indicated in FIG. 4 corresponds to the calculation of the "target angle" already explained with reference to FIG. 2, on the one hand from the system target torque (guide magnitude regulation) and the wheel movement data (perturbing magnitude regulation). As shown in FIG. 4 this is followed by the position-rotational speed regulation VA and finally the motor regulation VA, each described in detail in connection with FIG. 2.

In addition and therefore differently compared with the regulation concept shown in FIG. 2, in the context of the invention the target supporting torque VA (system target torque) specified by the guide magnitude regulation VA according to the representation in FIG. 4 is incorporated, according to the invention, not only in the calculation of the target position VA, but also in a "roll torque distribution VA validation". In other words, the system target torque specified as a guide magnitude is at this point incorporated is a test relating to the roll torque distribution for the motor vehicle.

As can also be seen in FIG. 4, for the testing of the specified system target torque for acceptability ("roll torque distribution VA validation") a further magnitude is also taken into account. This is the target supporting torque HA which is the system target torque of the rear axle. This takes place in that a system target torque specified by the guide magnitude regulation HA (of the rear axle) is transmitted by way of a corresponding communication channel (for example a CAN bus), to the roll torque distribution VA validation.

On the basis of the system target torques of the front and rear axles, in the context of the roll torque distribution VA validation—taking into account the time delay (due to the transmission)—a calculation of the roll torque distribution β existing at the time-point when the information is transmitted is possible. The calculated roll torque distribution β is then compared with the upper and lower limiting curves for the roll torque distribution (see FIG. 3). The roll torque distribution is then acceptable when the calculated roll torque distribution β is below the upper limiting curve and above the lower limiting curve for the roll torque distribution.

In principle the regulation scheme for the adjustable roll stabilizer of the rear axle is identical to that of the front axle. Provided in the same way is a roll torque distribution HA validation, which works in the same way, but correspondingly (conversely) the target supporting torque VA, i.e. the system target torque of the front axle is interrogated. In other respects the functional principle is as for the front axle, so in order to avoid repetitions explanations concerning it are superfluous.

If in the context of a test of the roll torque distribution for acceptability a value is found to be outside the acceptable limits for a maximum permitted error tolerance time, the system as a whole is changed to a safer condition, in particular switching off the actuators of both adjustable roll stabilizers (on the front axle and the rear axle) is permitted.

Indexes

1 Adjustable roll stabilizer
2 Actuator
3 Rotational axis
4 Electric motor
5 Multi-step planetary transmission
6a, 6b Left-hand (or right-hand) stabilizer section
7a, 7b Left-hand (or right-hand) wheel
8a, 8b Left-hand (or right-hand) control arm arrangement
9a, 9b Left-hand (or right-hand) hinged support
10 Vehicle body
11a, 11b Left-hand (or right-hand) stabilizer mounting
12a, 12b Left-hand (or right-hand) wheel height level sensor
13 Rotational speed sensor
20 Kinematics
z7a, z7b Height level of the left-hand (or right-hand) wheel
$M_{Wank}$ Roll torque (axle-related)
$M_{System}$ torque
n Motor rotational speed
HA Rear axle
VA Front axle
α System angle
β Roll torque distribution

The invention claimed is:

1. A method of operating an adjustable roll stabilizer of a motor vehicle, the adjustable roll stabilizer has an actuator which is rotatable relative to a rotational axis in order to twist two stabilizer sections connected thereto relative to one another about the rotational axis, wherein the stabilizer sections are radially spaced away from the rotational axis and each is coupled to a wheel suspension, the method comprising:
controlling the actuator based on a system target torque specified for the vehicle;
testing the specified system target torque for acceptability in relation to a roll torque distribution that is acceptable for the motor vehicle;
testing the system target torque for acceptability by determining for the specified system target torque a roll torque distribution obtained therefrom;
carrying out a comparison to see whether the roll torque distribution is within an acceptable range; and
defining the acceptable range of the roll torque distribution by at least one limiting curve which depends on a speed of the vehicle.

2. The method according to claim 1, further comprising bounding the acceptable rage of the roll torque distribution by an upper limiting curve and a lower limiting curve, such that an acceptable roll torque distribution exists when the determined roll torque distribution is below the upper limiting curve and above the lower limiting curve.

3. The method according to claim 1, further comprising initiating an error measure, when the system target torque specified for the adjustable roll stabilizer leads to a roll torque distribution which is outside the acceptable range.

4. The method according to claim 1, further comprising taking into account another system target torque specified for a further adjustable roll stabilizer of the motor vehicle when testing the specified system target torque for acceptability, for the determination of the roll torque distribution required for that, besides the system target torque specified for the adjustable roll stabilizer.

5. The method according to claim 1, further comprising determining the roll torque distribution from a ratio between roll torque supported by a first axle and overall roll torque supported by the motor vehicle.

6. The method according to claim 1, further comprising determining an overall roll torque supported by the motor vehicle from a sum of roll torque supported by a first axle and roll torque supported by a second axle.

7. The method according to claim 1, further comprising controlling the actuator on a basis of the system target torque in such a manner that the system target torque is taken into account for determinating a target angle from which, by way of a position-rotation speed regulator, a target motor torque for controlling a motor of the actuator is determined.

8. The method according to claim 1, further comprising utilizing the method for operating two adjustable roll stabilizers of the motor vehicle, and the actuator for one of the two adjustable roll stabilizers is controlled on the basis of a system target torque specified for the vehicle for the axle concerned, wherein, in each case, carrying out an independent test of the specified system target torque for acceptability in relation to the roll torque distribution that is acceptable for the motor vehicle.

9. A two-axled motor vehicle having first and second adjustable roll stabilizers, which are suitable for carrying out the method according to claim 1, the first adjustable roll stabilizer is associated with a front axle and the second adjustable roll stabilizer is associated with a rear axle,
each of the first and the second adjustable roll stabilizers is controllable as a function of a guide magnitude in a form of an axle-related system target torque specified for the vehicle,
wherein a device, for testing the axle-related system target torque for acceptability in relation to a roll torque distribution that is acceptable for the motor vehicle, is associated with each of the first and the second adjustable roll stabilizers.

10. A method of operating an adjustable roll stabilizer of a motor vehicle, the adjustable roll stabilizer has an actuator which is rotatable relative to a rotational axis in order to twist two stabilizer sections connected thereto relative to one another about the rotational axis, wherein the stabilizer sections, are radially spaced away from the rotational axis and each is coupled to a wheel suspension, the method comprising:
controlling the actuator based on a system target torque specified for the vehicle;
testing the specified system target torque for acceptability in relation to a roll torque distribution that is acceptable for the motor vehicle;
when the system target torque specified for the adjustable roll stabilizer leads to a roll torque distribution which is outside the acceptable range, initiating a change to a safer condition by switching off the adjustable roll stabilizer of the motor vehicle.

* * * * *